March 3, 1970     M. A. CONANGLE     3,498,368
DOUBLE-WALLED CONSERVATORY

Filed Nov. 22, 1967     2 Sheets-Sheet 1

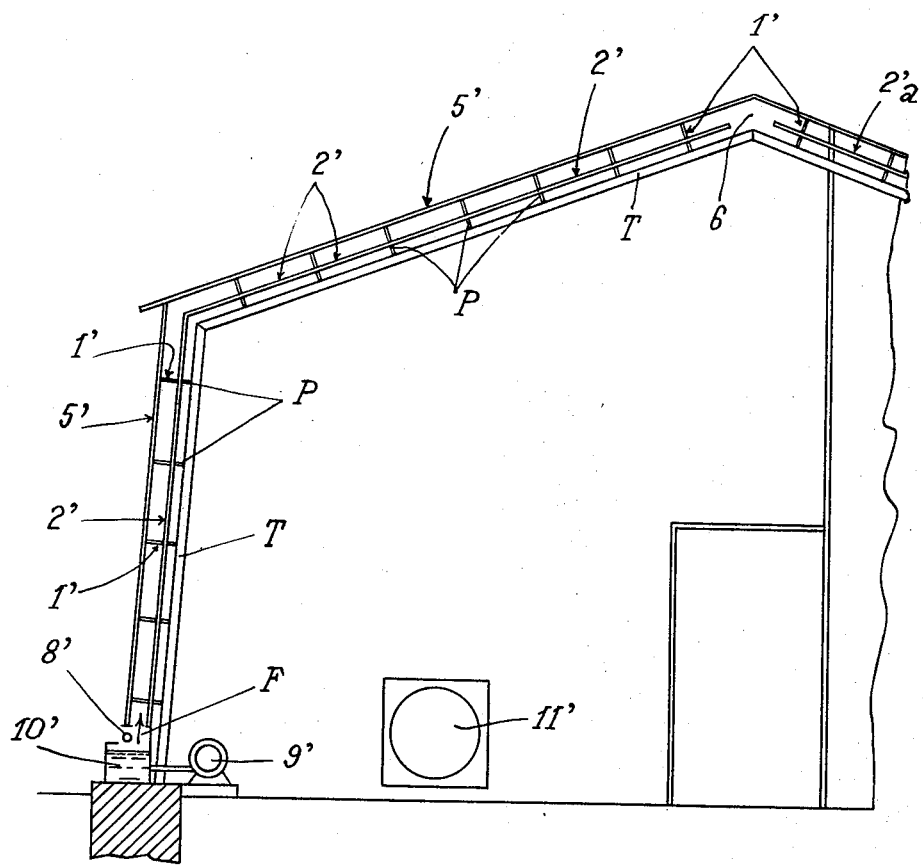

United States Patent Office 3,498,368
Patented Mar. 3, 1970

3,498,368
DOUBLE-WALLED CONSERVATORY
Maxime Albert Conangle, Alpes-Maritimes,
La Suve, Vence, France
Filed Nov. 22, 1967, Ser. No. 685,066
Claims priority, application France, Feb. 13, 1967,
94,759
Int. Cl. F24h 9/08; F24f 3/14, 7/00
U.S. Cl. 165—53                                    4 Claims

ABSTRACT OF THE DISCLOSURE

A conservatory for horticultural purposes provided with a double glass wall forming a jacket into which hot or cold air and/or water is injected so as to adjust the temperature of the conservatory to the desired value. The heating or cooling water is caused to flow over the inner glass wall and is preferably recycled. Air, advantageously moistened to the desired extent, can pass out of the jacket into the conservatory through an opening provided at the upper end of the inner glass wall.

---

The present invention has for its object improvements in the execution and operation of horticultural conservatories or greenhouses. This improved conservatory has for its chief novelty the use of two glass walls between which hot or cold water or air is caused to flow at a temperature depending on external atmospheric conditions in order to keep the inside of the conservatory at the desired temperature. For instance, if it is desired to heat the conservatory, hot water may be caused to stream over the upper end of the inner glass wall or else air may be blown into the bottom of the jacket formed between the two walls, which air is heated by any conventional means or by atomized hot water, said air thereafter entering the conservatory through an opening formed at the upper end of the inner glass wall. In contradistinction, the cooling of the conservatory is obtained by causing cold water to stream over the upper end of said inner glass wall while air may be simultaneously blown out of the external atmosphere into the lower end of the double-walled jacket, said air being cooled through contact with said water and entering the conservatory through the last-mentioned upper opening. It is also possible to cool said air by atomizing cold water into it at the lower end of the jacket. Such arrangements may furthermore be associated in any desired manner with a view to adjusting not only the temperature inside the conservatory, but also the hygrometric condition of its atmosphere.

The conservatory designed in accordance with my invention includes thus the following components, some of which may be omitted if required:

A skeleton constituted by a double supporting structure carrying the two glass walls, spacing means being fitted between the latter and the inner wall being provided near its upper end with an opening connecting the jacket formed between the two glass walls with the inside of the conservatory, Means for causing water to stream over the upper end of the inner glass wall, or else for atomizing water into the lower end of the double-walled jacket, Pumps adapted to circulate water in a closed circuit, from tanks located in the lower part of the conservatory, Fans and air intakes which exert suction or pressure on the air carried between the two glass walls either to introduce air into the conservatory, or to remove the air from the conservatory and discharge it into the external atmosphere, Thermometers and hygrometers which allow ascertaining the temperature and moisture of the atmosphere in the conservatory and which are adapted to act on means controlling the flow of water and/or air in order to maintain automatically the desired conditions which are to prevail in the atmosphere of the conservatory.

The accompanying drawings illustrate by way of example two embodiments of my invention. In said drawings:

FIG. 2 is a similar view of the second embodiment.

Figure 1:
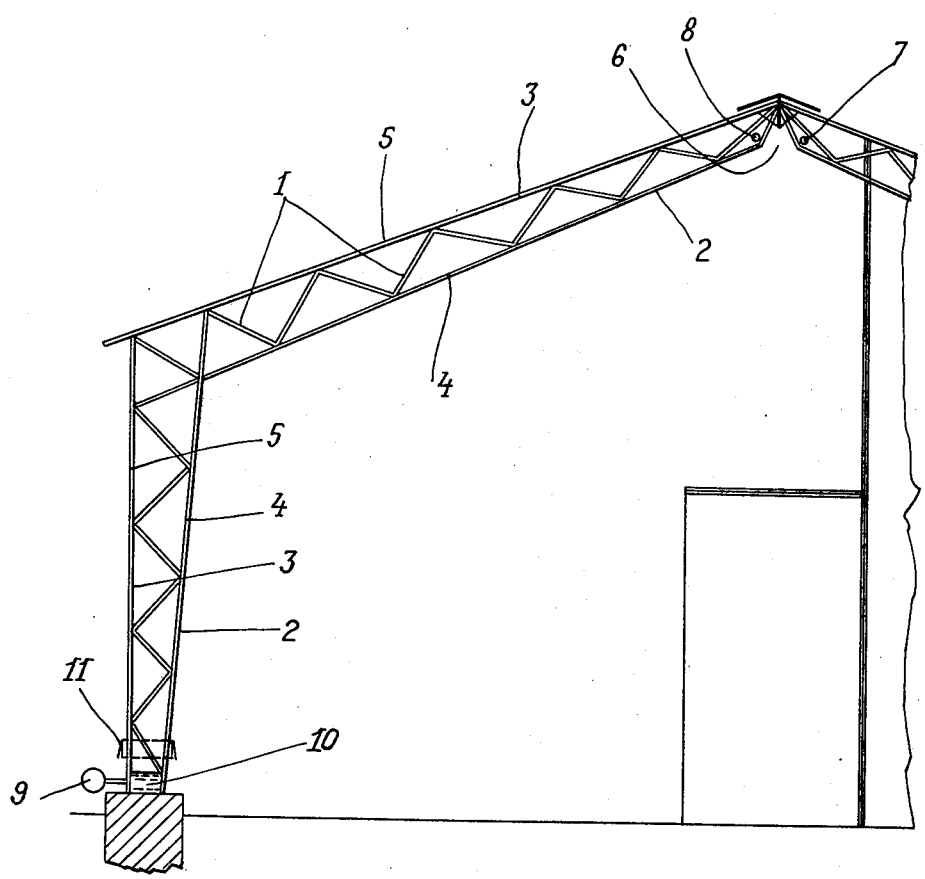
FIG. 1 is a vertical diagrammatic cross-section of a first embodiment.

In FIG. 1, the framework is constituted by a plurality of inner and outer metal members 2 and 3 which carry sheets of so-called cathedral glass illustrated respectively at 4 and 5 and extending from the bottom up to the crest of the conservatory. The inner and outer walls thus formed are associated with stays 1 bracing said metal members and ensuring their spacing, whereby the jacket between the two glass walls is obtained.

The parts forming the inner wall are not interconnected at the crest of the conservatory and form between them a gap or air intake 6 through which the conservatory communicates with the air between the two glass walls.

At either side of the crest of the inner wall and in parallelism therewith are spraying pipes 7 and 8 which are fed with water by pumps 9 located at the lower end of the conservatory walls in the vicinity of tanks 10 collecting the water which has streamed over the inner surfaces of the glass walls. The water is thus caused to circulate through a closed circuit.

Auxiliary arrangements which are not illustrated such as gas or gas-oil burners, electric fans adapted to revolve in either direction and the like ensure the constancy of the conditions prevailing in the atmosphere of the conservatory. These are controlled automatically by thermostats and hydrostats.

The operation of the conservatory can be readily understood. If the conservatory is to be cooled, the pumps become operative and spray cold water onto the inner glass wall, while fans feed external air into the jacket between said two walls.

If, in contradistinction, the conservatory is to be heated, this is obtained by spraying water heated by a burner and even, if required, by the combustion gases formed by the burners which serve for heating the water in the tanks 10.

In order to ensure a suitable ventilation inside the conservatory, fans 11 may deliver through the gap 6, formed at the upper end of said conservatory in registry with the crest, air sucked out of the outer atmosphere or else air sucked out of the conservatory through said gap, so as to discharge it into the outer atmophere. It is possible to operate in a similar manner if the air inside the conservatory is too moist or if, in contradistinction, said air is too dry, in which case the fans are set to run in a direction such as will drive into the conservatory air which has been constrained to sweep over the entire surface of the glass wall which has been sprayed with water at the desired temperature.

Lastly, and even in summer, it is possible to reduce the luminosity of the conservatory by causing water tinged with color to stream over the latter.

The water carried inside the tanks 10 may advantageously be constituted by collecting the rainwater which has fallen onto the outer glass wall and, if required, a constant level may be provided inside the tank by conventional means.

In order to provide a sufficiently homogeneous structure, the transverse walls of the conservatory may be constituted in a similar manner by two glass partitions which should however be arranged vertically and in parallelism.

In the embodiment illustrated in FIG. 2, no water is injected into the upper end of the jacket between the glass walls and the conservatory is heated by blowing hot air into the lower end of said jacket. Said air flows upwardly and enters the conservatory through the opening provided adjacent the crest of the inner glass wall. Water-spraying pipes are located in this case at the same level as the tanks and have atomizing nozzles so as to moisten the air delivered or sucked into said jacket.

In FIG. 2, the framework T made of metal tubes carries purlins P carrying in their turn the members 2' supporting the inner glass wall. Spacing members 1' extending above the purlins P carry the members 5' supporting the outer glass wall. Along the crest, a gap 6 is formed between the two upper sloping sections 2'–2'a of the inner glass wall and through said gap atmospheric air sucked in at the lower end F of the jacket between the glass walls for cooling purposes enters the inside of the conservator or else hot air delivered at said lower end F for heating purposes is caused to enter the conservatory through the said gap. 8' designates the injecting nozzle atomizing water delivered by the pump 9' into said air entering the conservatory. A fan 11' feeds air pipes which are not illustrated and which may thus suck in either external atmospheric air or else hot air or the air inside the conservatory and then deliver said air after it has been moistened at room or at elevated temperature.

Preferably, the outer glass wall is made of so-called cathedral glass or rought cast glass, with a view to diffusing light whereas the inner glass wall is made of ordinary glass.

What I claim is:

1. A horticultural greenhouse comprising inner and outer spaced, glass panels constituting a double-wall glass structure with sides and a roof defining an interior enclosure, said inner wall having an opening at the roof providing communication between the interior enclosure and the space between said glass panels, said outer wall having an opening at least at one side of the structure in the region of the floor thereof for providing communication between the space between the glass panels and the ambient outside atmosphere, means for producing flow of a fluid in said space between said panels and means for conditioning the fluid in said space, said fluid being air and the conditioning means being operative to condition the air with regard to temperature and humidity, said means for producing flow of air in said space between said panels comprising a blower for sucking air into said space between said panels and for advancing the air through said space, said means for conditioning the air comprising means for introducing atomized water into the air, a longitudinal trough at the bottom of a first side of the structure for the collection of water accumulating on said walls on the internal surfaces thereof, and pump means for supplying water collected in said trough to the means which introduces atomized water into the air.

2. A greenhouse as claimed in claim 1 comprising means for heating the water in said trough.

3. A greenhouse as claimed in claim 1 wherein said blower is located at the bottom of the structure.

4. A greenhouse as claimed in claim 1 wherein said means for introducing atomized water into the air comprises nozzles disposed adjacent said opening in the outer glass panel.

References Cited

UNITED STATES PATENTS

| | | | |
|---|---|---|---|
| 2,141,855 | 12/1938 | Dodge | 98—30 |
| 2,484,127 | 10/1949 | Stelzer | 165—49 |
| 2,889,763 | 6/1959 | Pine | 98—31 |
| 3,231,986 | 2/1966 | Touton | 8—31 |

ROBERT A. O'LEARY, Primary Examiner

C. SUKALO, Assistant Examiner

U.S. Cl. X.R.

98—30; 165—60, 118